United States Patent Office 3,309,328
Patented Mar. 14, 1967

3,309,328
HIGH STRENGTH ADHESIVE FOR BUILDING MATERIALS
Felix P. Carroll, Chatham, and Robert J. Hoelzer, Westfield, N.J., assignors to Allied Chemical Corporation, New York, N.Y., a corporation of New York
No Drawing. Filed June 3, 1964, Ser. No. 372,393
5 Claims. (Cl. 260—23)

This invention relates to adhesives and more particularly to new and improved adhesive compositions for bonding of building materials. It also specifically relates to an adhesive construction system in which a synthetic foam such as rigid urethane foam is bonded to masonry and a wallboard such as gypsum wallboard.

New adhesive materials are always in demand to provide improved bonding of available materials and in making possible the assembly and use of more advanced and efficient structures. An assembly or structure of recent interest is a masonry wall finishing system in which a masonry structure such as a cinder block wall has adhesively bonded thereto a layer of rigid urethane foam which is then covered by gypsum wallboard. An adhesive suitable for such an assembly would be similar to the adhesives for interior gypsum wallboard systems in that it should be a low cost filled composition which combines the many requisite properties for the job. Unlike ordinary wallboard adhesives a premium must be placed on strength and durability properties under widely varying humidity and temperature conditions. Also the adhesive repeated freeze and thaw must be resistant to cycling to which it may be subjected during shipping and storage. In addition, such adhesive also should have ability to be easily applied and "cleaned-up" with water yet also readily set up without flow or running from the place of application.

Generally, the preparation of filled adhesive compositions for building construction materials is far from a simple matter and their formulation largely empirical in that the final properties of any given formulation is difficult to predict and often unexpected. A major reason for this difficulty is that the addition of one component usually affects several properties of the composition and often in such a manner as to depreciate one or more properties and the performance of the product. In our investigation we tried the commercially available adhesives recommended for gypsum wallboard and building materials generally and found them to be deficient in the several properties required in combination for the proposed masonry wall structure. Our further search for a satisfactory adhesive involved numerous experimental formulations which more than adequately confirmed the empirical nature of experimentation with such compositions.

An object of the present invention is to provide a new and improved adhesive composition particularly adapted for building materials.

Another object of the invention is to provide a filled adhesive composition combining desired properties including strength, durability, ease of application and ability to rapidly set up without running while simultaneously providing good "open time" and ability to be easily cleaned with water.

Another object is to provide a low cost adhesive for bonding of urethane foam slabs both to interior wallboard such as gypsum wallboard and to exterior building wall structures such as masonry walls.

A further object is to provide a low cost filled adhesive composition for high strength bonding of construction materials including rigid insulating urethane foam to provide finished construction assemblies characterized by high strength and ability to sustain under extreme variations of temperature and humidity conditions.

Other objects and advantages will be evident from the following description of the invention.

In accordance with the present invention it has been found that a new and improved adhesive composition of unusually good mechanical and bonding properties is provided by a paste-like aqueous emulsion having incorporated therein a small amount of a polyacrylate salt together with a finely divided kaolin of definite particle size as filler and a vinyl acetate polymer and plasticizer therefor as adhesive binder. More specifically, the improved adhesive of this invention comprises, by weight of the total emulsion: (A) about 15 to 30% of polyvinyl acetate; (B) about 2 to 8% of plasticizer for said polyvinyl acetate; (C) about 0.3 to 3% of a polyacrylate salt selected from the group consisting of alkali metal salts, ammonium salts, and mixtures thereof; (D) about 25 to 50% of finely divided filler of which at least about 40% thereof is a refined kaolin having particle size distribution such that at least 85% of said kaolin is greater than 1 micron, at least 70% greater than 2 microns and average particle size less than about 10 microns; (E) about 1 to 5% of emulsifying agent; and (F) water in an amount sufficient to give a solids content between about 55–75% by weight, preferably a solids content between about 58–70% by weight. During preparation of the composition there will also be incorporated therein a small amount of dispersing material and preservative for the components. The adhesive composition provided by the invention is also characterized as being a thixotropic paste having the following desired combination of properties: (1) excellent shelf life and ease of application including ability to be readily applied with a caulking gun or by other convenient means; (2) ability to rapidly set up without running from the place of application; (3) good open-time; (4) ability to be easily cleaned up with water; (5) low cost filled composition; (6) high strength; (7) ability to provide durable lasting bonds; (8) retention of bond strength at low and high temperatures; (9) retention of high strength after extreme variation of temperature conditions including repeated cycles of freezing and thawing; (10) resistance to moisture, vermin and humidity; (11) nonflammability and low toxicity; and (12) excellent compatibility with building materials both of inorganic and organic composition including gypsum, cellulosic materials and urethane foams. The adhesive composition of the invention is not only especially useful in bonding of rigid urethane foam to masonry and gypsum wallboard but also generally in the bonding of construction materials including fiberboard, wood framing, and asbestos-cement boards. In such applications the adhesive of the invention is outstanding because of ability to provide high strength bonding and a combination of properties including those above-identified, all of which are desired properties of an adhesive to be used in the bonding of construction materials and systems.

The polyvinyl acetate employed in the adhesive of the invention may be any of the vinyl acetate polymers suitable for adhesive applications. The polyvinyl acetate is preferably of small average particle size of less than about 5 microns, usually between about 0.1 to 3 microns. Such vinyl acetate polymers may be prepared by emulsion polymerization and are available commercially in the resulting emulsion containing the emulsifying agent and polyvinyl acetate in an amount generally between about 45–65% by weight. In preparation of the adhesive it is desirable to employ the polyvinyl acetate in emulsion form and it is therefore particularly convenient to supply the polymer in the form of the emulsion obtained by preparation of the polymer by emulsion polymerization with emulsifying agents suitable for producing the adhesive composition in stable emulsion form. The vinyl acetate polymer constitutes about 15 to 30% by weight of the total adhesive composition, preferably between about 18–28% by weight of the total composition.

The adhesive of the invention includes a plasticizing material for the vinyl acetate polymer. The plasticization of vinyl acetate is well-known and may be accomplished with a number of materials including the phthalate, adipate, sebacate, and phosphate monomeric esters, polyesters, and chlorinated aliphatic and aromatic hydrocarbons. The preferred plasticizers for the adhesive of this invention are the phthalate esters of alcohols having 2 to 16 carbon atoms, more preferably 3 to 8 carbon atoms. Examples of such phthalate esters include dicyclohexyl phthalate, diethyl phthalate, diphenyl phthalate, diamyl phthalate, diethoxyethyl phthalates, dibutoxyethyl phthalate, dioctyl isophthalate, dibutyl phthalate, didecyl phthalate, octyl decyl phthalate, diisobutyl phthalate, and dicarbitol phthalate. The amount of plasticizer employed will range generally between about 2 to 8% by weight of the total composition, more usually between about 3 to 6% by weight. The optimum amount of plasticizer will vary depending largely on the amount of polyvinyl acetate, it being preferred to employ between about 15–25% by weight plasticizer based on the weight of the polyvinyl acetate.

In the adhesive composition of the invention it is important to employ as filler a specific kaolin clay of definite particle size. The clay found to be required in obtaining the desired adhesive properties is a refined kaolin having particle size distribution such that at least 85% is greater than 1 micron in size and at least 70% greater than 2 microns with average particle size of the kaolin being less than about 10 microns. Preferably, the kaolin has particle size distribution such that at least 75% is greater than 2 microns with average particle size between about 4–7 microns. The refined clay employed in the invention may be obtained from raw kaolin by substantially removing grit or material larger than about 50 microns and then further treating to remove sufficient of the finer kaolin particles to provide the desired particle size distribution. Such kaolin clay is uncalcined and has a flat hexagonal plate particle shape and the particle size expressed herein is given in equivalent spherical diameter of such hexagonal shapes. In the adhesive composition it is desired but not necessary that all the filler be kaolin of the indicated particle size. Good results may be obtained by partial substitution of other filler materials of suitable particle size so long as at least 40% of the total filler is kaolin of desired size. Ground limestone is an example of a suitable filler which may partially replace the kaolin. The total amount of filler employed in the aqueous adhesive composition is generally between about 25 to 50% by weight of the total composition, preferably between about 30–40% by weight.

In the adhesive composition of the invention it has been found that the incorporation of a small amount of a salt of a polyacrylate is particularly important to obtaining the desired combination of mechanical and adhesive properties. The polyacrylate salt employed in the composition may be derived from a polymer or copolymer of acrylic acid or ester thereof, or copolymer of said acids and esters with no more than about 70% of a methacrylic acid or ester, the acrylate esters being of alcohols and amino-alcohols of 1 to 4 carbon atoms, preferably 1 to 2 carbon atoms. Also useful are the copolymers containing up to about 50% by weight of acrylamide or methacrylamide. The desired polyacrylate salt for use in the invention may be obtained by conventional procedures involving, for example, the neutralization or saponification of the polymerized product with the alkali metal hydroxide or ammonium hydroxide. Generally, the preferred polyacrylate is a sodium polyacrylate. Only about 0.3 to 3.0% by weight of the polyacrylate need be incorporated in the adhesive composition to obtain the desired beneficial properties, preferably between about 0.5 to 1.5% by weight.

Dispersing agents are also included in the adhesive composition in an amount between about 0.1 to 3.0% by total weight. Exceptionally good results are obtained when the dispersing material is soya bean extract such as a soya lecithin compound or a tetra alkali pyro phosphate, such as tetra sodium pyro phosphate. Particularly desirable is a combination of these dispersing materials each in an amount between about 0.05 to 1.5% by weight of the total adhesive composition.

The adhesive composition of the invention may be prepared by simple mixing at room temperatures in conventional slow speed mixing apparatus. Generally, it is preferred to first admix a preservative with most of the additional water requirements and then add the prepared vinyl acetate emulsion slowly to avoid breaking of the emulsion. The preservative added may be any of the type well-known for use with vinyl acetate including, by way of example, the phenylmercury propionates or acetates and the alkali metal salts of orthophenyl phenol. The amount of preservative added is generally between about 0.1 to 0.5% by weight of the final composition. Plasticizer, dispersing agents and filler are then added in that order with each addition followed by mixing to assure homogeneity. Finally, the polyacrylate is added in solution containing generally between about 5–15% solids. Mixing is again continued to assure homogeneity and form a heavy paste-like mass. The resulting adhesive composition is further characterized by thinning on application of shearing forces such that it can be easily applied by conventional efficient means such as a caulking gun yet rapidly set up without running from the place of application.

The following example in which parts and percentages are by weight demonstrates the practice and advantages of the present invention. In the example an adhesive prepared in accordance with the invention is evaluated in a series of Evaluation Tests and compared with commercially available adhesives recommended for use in building construction.

The adhesive was prepared in a 25 gallon batch capacity mixing drum equipped with a slow speed paste mixer operating at 50 r.p.m. The mixing drum was charged with 31 parts water in which there was dissolved 0.72 part of a sodium salt of orthophenyl phenol preservative obtained under the trademark "Dowicide" A from the Dow Chemical Corporation. There was then added 119 parts of an aqueous polyvinyl acetate emulsion containing 56% solids and obtained from the Air Reduction Chemical and Carbide Company under the trademark "Vinac" WR–50. After mixing for 5 minutes there was added 13.32 parts of phthalate plasticizer obtained under the designation Plasticizer 135 from the Eastman Chemical Products Corporation. As dispersing agents there was then added 1 part tetra sodium pyro phosphate and 0.66 part of soya lecithin compound obtained from Ross & Rowe Corporation under the designation R & R 551. After mixing for 45 minutes 100 parts of finely divided clay was added and mixing continued for an additional 45 minutes to obtain a homogeneous mass. The clay was obtained under the designation ASP 400 from the Minerals and Chemicals Phillip Corporation and had average particle size of 4.8 microns with 78% greater than 2 microns. There was last added 22.2 parts of a 10% aqueous solution of sodium polyacrylate obtained under the trademark "Acrysol" HV–1 from Rohm & Haas Co. Mixing was continued for 32 minutes to form a smooth heavy paste which had a total solids content of 64%. The mixture was thixotropic and one half hour after preparation had an initial consistency between about 120–180 Brabender Units decreasing to an average of about 40–60 between 1 to 5 minutes at 50 r.p.m. in a 1 pint 3¼ inch diameter can as measured by a Visco-Corder equipped with a standard flag paddle and employing a 2000 centimeter gram cartridge. Thirty days after preparation the composition had an initial consistency between 240–300 decreasing to an average between 50–70 between 1 to 5 minutes in the Visco-Corder using the same paddle and cartridge. The Visco-Corder is a consistency measuring device manufactured by C. W. Brabender Instruments Corporation, South Hackensack, N.J., U.S.A.

In the following evaluation tests a member of different type assemblies are employed including wood-to-wood, foam to cinder block and cinder block to cinder block. The primary shear bond tests were conducted on the wood-to-wood assemblies as the cohesive strength of such assemblies was the better basis for strength evaluation. The wood assembly was constructed of 1⅝ inch x 4½ inch fir studs. In fabricating the stud block test assemblies, a bead of the adhesive (enough to squeeze out on all four sides and the ends) was applied to the comb grain of one stud and the matching stud pressed on such that the two pieces were offset by ½ inch to give a 1⅝ inch x 4 inch (6.5 square inch) bonded area. Excess adhesive material was removed. In making the masonry assemblies including foam-to-cinder block and cinder block-to-cinder block the adhesive was applied with a caulking gun with a ⅜ inch nozzle. The cinder blocks employed were 3½ x 7½ x 2¼ inches in size and were offset 1 inch in the assemblies. All assemblies were cured for two weeks at room temperature prior to testing unless otherwise indicated. In the following test the adhesive of the invention is designated as Composition 220 and is compared with 5 commercially available adhesives which are recommended for use in bonding of building materials. These 5 adhesives are designated A–E, inclusive. Adhesives A, C and E are based on reclaimed rubber as binder. Adhesive B is based on a polyvinyl acetate binder while adhesive D is based on a butadiene-styrene copolymer latex binder.

*Evaluation Test No. 1.—Shear strength*

Adhesive:                    Shear strength, p.s.i.
    Composition 220 _____ 225
    Adhesive A _____ 18
    Adhesive B _____ 132
    Adhesive C _____ 89
    Adhesive D _____ 115
    Adhesive E _____ 156

*Evaluation Test No. 2.—Low temperature bond*

In this test the fir stud blocks were conditioned overnight at 35° F. The assembly was made at room temperature and then immediately conditioned at 35° F. for about 5 hours and then frozen at 10–15° F. overnight. The assemblies were then conditioned for two weeks at room temperature.

Adhesive:                    Shear strength, p.s.i.
    Composition 220 _____ 220
    Adhesive A _____ 19
    Adhesive B _____ 130
    Adhesive C _____ 85
    Adhesive D _____ 115
    Adhesive E _____ 145

*Evaluation Test No. 3.—Heat Aging*

In this test fir stud assemblies were conditioned for two weeks and then subjected for an additional 2 weeks time to heat aging temperature and humidity cycle, as follows:

| Period (Hours) | Temperature (° F.) | Relative Humidity (percent) |
|---|---|---|
| 4 | 140 | 85 |
| 4 | 32 | 100 |
| 16 | 140 | 10 |
| 6 | 140 | 85 |
| 18 | 140 | 10 |

Before testing the heat aged assemblies were allowed to stand for 2 days at room temperature.

Adhesive:                    Shear strength, p.s.i.
    Composition 220 _____ 250
    Adhesive A _____ Not Tested
    Adhesive B _____ 48
    Adhesive C _____ 100
    Adhesive D _____ 105
    Adhesive E _____ Not Tested

*Evaluation Test No. 4.—Application and shelf life*

The ease of application of the adhesive is determined by applying the adhesive with a caulking gun and correlating the results with the Visco-Corder.

| Adhesive | Application | Shelf Life |
|---|---|---|
| Composition 220 | Easy | Good. |
| Adhesive A | Very difficult | Do. |
| Adhesive B | Easy | Do. |
| Adhesive C | Difficult | Do. |
| Adhesive D | Fair | Poor. |
| Adhesive E | Very difficult | Do. |

*Evaluation Test No. 5.—Shear test*

In this test gypsum wallboard was bonded to a slab of rigid urethane foam and the resulting assembly cured for two weeks at room temperature prior to testing. Shear strength test showed that all test assemblies in which Composition 220 was employed as adhesive were strongly bonded together with all failures occurring by reason of the foam. The adhesive compositions A, C and E resulted in failure of the adhesive.

*Evaluation Test No. 6.—Shear test*

In this test rigid urethane foam slabs were bonded to cinder blocks and the assemblies conditioned for two weeks at room temperature prior to testing. All assemblies bonded with Composition 220 resulted in failure of the foam and a strong bond between the foam and cinder block. The adhesive Compositions A, C and E were noted to result in failure of the adhesive by the same shear test.

*Evaluation Test No. 7.—Freeze-Thaw*

In this test fir stud assemblies were prepared with adhesive which had been first subjected to up to 5 freeze-thaw cycles in which the adhesive was subjected to a temperature of 10° F. for 16 hours and then to a temperature of 70–72° F. for 8 hours. The results tabulated below give values after each freeze-thaw cycle.

| Adhesive | Shear Strength, p.s.i. (Freeze-Thaw Cycles) | | | | |
|---|---|---|---|---|---|
|  | 1 | 2 | 3 | 4 | 5 |
| Composition 220 | 225 | 240 | 240 | 200 | 190 |
| Adhesive A | (1) | (1) |  |  |  |
| Adhesive B | 26 | 36 | 28 | 0 | 0 |
| Adhesive C | (1) | (1) |  |  |  |
| Adhesive D | 0 | 0 | 0 | 0 | 0 |
| Adhesive E | (1) | (1) |  |  |  |

[1] Not tested.

Evaluation Test No. 1 shows the adhesive composition of the invention to be markedly superior in bond strength over the five commercially available adhesives A–E, inclusive. Similarly the Adhesive 220 composition is superior after low temperature bonding as shown by Test No. 2. Evaluation Test No. 3 also shows the adhesive of the invention to be superior after heat aging and particularly with respect to Adhesive B which is relatively low. Evaluation Test No. 4 shows the composition of the invention to have both good application properties and shelf life while only Adhesive B is satisfactory with respect to both these properties among the five commercially available adhesives. Evaluation Tests Nos. 5 and 6 show that the adhesive composition of the invention is highly satisfactory for bonding of gypsum wallboard and cinder block to urethane foam while the adhesive compositions A, C and E resulted in adhesive failure two weeks after application. Evaluation Test No. 7 shows the adhesive composition of the invention to retain excellent strength after five freeze-thaw cycles while both Adhesives B and D completely failed this test. In short, the adhesive composition of the invention provides a superior combination of all properties while the five commercially available adhesives are deficient with respect to at least two of the properties desired for use with construction assemblies such as the proposed masonry wall finishing system.

We claim:

1. An adhesive composition especially adapted for high strength bonding of building materials comprising an aqueous paste-like emulsion of: (A) about 15 to 30% by weight of polyvinyl acetate; (B) about 2 to 8% by weight of plasticizer for said polyvinyl acetate; (C) about 0.3 to 3% by weight of a polyacrylate salt selected from the group consisting of alkali metal salts, ammonium salts and mixtures thereof; (D) about 25 to 50% by weight of finely divided filler of which at least 40% thereof is a refined kaolin having particle size distribution such that at least 85% is greater than 1 micron, at least 70% greater than 2 microns and average particle size less than about 10 microns; and (E) water in an amount sufficient to give a solids content between about 55–75% by weight; said composition characterized by thinning on application on shear forces.

2. An adhesive composition especially adapted for high strength bonding of building materials comprising an aqueous paste-like emulsion of: (A) about 15 to 30% by weight of polyvinyl acetate; (B) about 2 to 8% of a phthalate ester of an alcohol of 2 to 16 carbon atoms as plasticizer for said polyvinyl acetate; (C) about 0.3 to 3% by weight of a polyacrylate salt selected from the group consisting of alkali metal salts, ammonium salts, and mixtures thereof; (D) about 25 to 50% by weight of finely divided filler of which at least 40% thereof is a refined kaolin having particle size distribution such that at least 85% is greater than 1 micron, at least 70% greater than 2 microns and average particle size less than about 10 microns; (E) about 0.1 to 3% by weight of dispersing agent selected from the group consisting of soya lecithin, tetra alkali pyro phosphates, and mixtures thereof; and (F) water in an amount sufficient to give a solids content between about 55–75% by weight; said composition characterized by thinning on application on shear forces.

3. The adhesive composition of claim 2 in which the dispersing agent is a mixture of soya lecithin and tetra alkali pyro phosphate in a total amount between about 0.1 to 3.0% by weight of the composition, said adhesive containing water in an amount to give solids content between about 58–70% by weight.

4. An adhesive composition especially adapted for high strength bonding of building materials comprising an aqueous paste-like emulsion of: (A) about 18 to 28% by weight of polyvinyl acetate; (B) about 3 to 6% of a phthalate ester of an alcohol of 3 to 8 carbon atoms as plasticizer for said polyvinyl acetate; (C) about 0.5 to 1.5% by weight of sodium polyacrylate; (D) about 30 to 40% by weight of a refined kaolin having particle size distribution such that at least 85% is greater than 1 micron, at least 70% greater than 2 microns and average particle size between about 4–7 microns; (E) about 0.1 to 3% by weight of dispersing agent selected from the group consisting of soya lecithin, tetra alkali pyro phosphates, and mixtures thereof; and (F) water in an amount sufficient to give a solids content between about 58–70% by weight; said composition characterized by thinning on application on shear forces.

5. The adhesive composition of claim 4 in which the dispersing agent is a mixture of soya lecithin and tetra sodium pyro phosphate each in an amount between 0.05 and 1.5% by weight of the composition.

References Cited by the Examiner
UNITED STATES PATENTS

| | | | |
|---|---|---|---|
| 2,613,156 | 10/1952 | McGaffin et al. | 260—29.6 |
| 2,684,342 | 7/1954 | Eckert | 260—8 |
| 2,699,432 | 1/1955 | Marra et al. | 260—29.6 |
| 2,956,973 | 10/1960 | Holdsworth | 260—8 |

MURRAY TILLMAN, *Primary Examiner.*

W. C. BRIGGS, SR., *Assistant Examiner.*